March 17, 1970 F. KALWAITES ET AL 3,501,565
METHOD OF TRANSVERSE STRETCHING ORIENTABLE SHEET MATERIAL
Filed Feb. 23, 1967 2 Sheets-Sheet 2

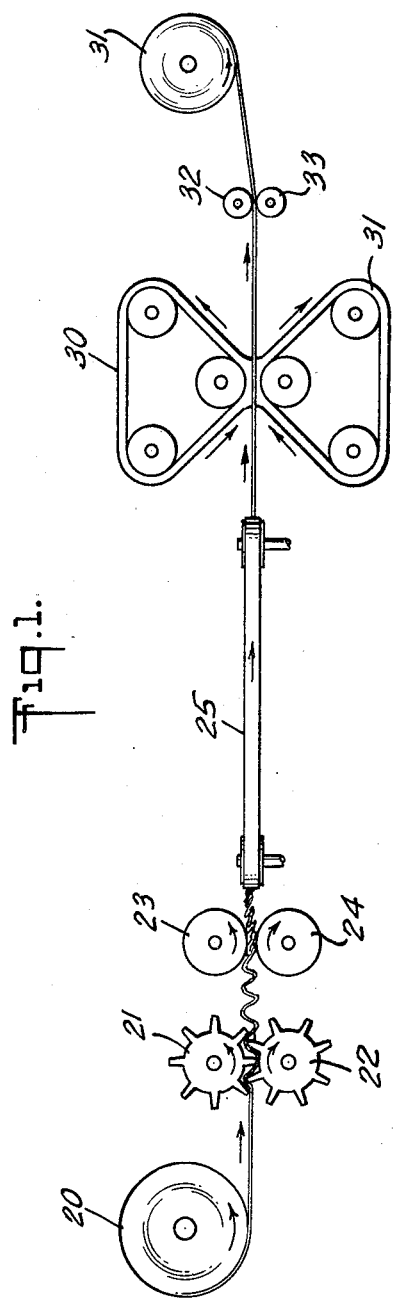
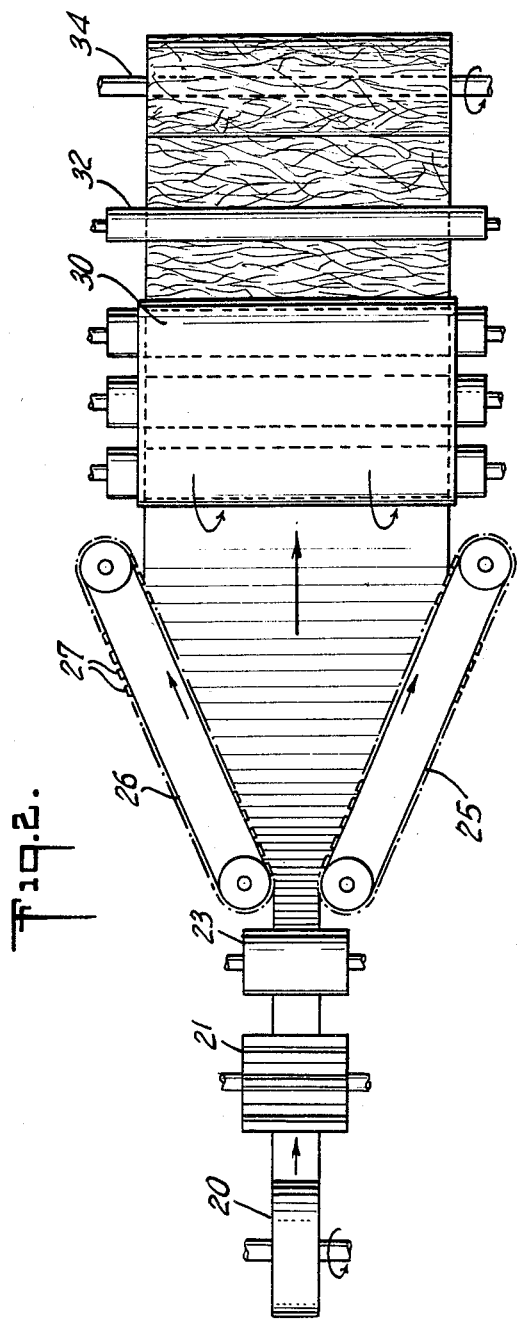

INVENTORS:
FRANK KALWAITES
WILLIAM R. SIBBACH
BY
ATTORNEY

United States Patent Office 3,501,565
Patented Mar. 17, 1970

3,501,565
METHOD OF TRANSVERSE STRETCHING ORIENTABLE SHEET MATERIAL
Frank Kalwaites, Somerville, and William Sibbach, Ridgewood, N.J., assignors to Johnson & Johnson, a corporation of New Jersey
Filed Feb. 23, 1967, Ser. No. 618,188
Int. Cl. B29d 7/24; B31f 1/08; D06c 3/00
U.S. Cl. 264—288
9 Claims

ABSTRACT OF THE DISCLOSURE

Orientable film is stretched transversely while being decelerated in the longitudinal direction. When performed under certain specified conditions of transverse stretching and longitudinal deceleration, the process results in a fibrillatable film.

---

This invention relates to a method for transversely stretching sheet material which can be oriented, and more particularly to a method for uniformly transversely stretching orientable sheet material to a sufficiently high degree so that the oriented material may be split or fibrillated.

In forming what are termed split fiber webs, that is, webs of mutually interconnected fibers produced from plastic films, it is necessary to highly orient the film in one direction. By high orientation it is meant an orientation of from 4:1 to 15:1 or even higher. When orienting to produce fibers, the molecules or crystals of the plastic film must be free to move and align themselves in the direction of orientation. There should be little, if any, restraining force which will reduce the mobility of the molecules within the plastic film.

In practice, it is desirous to carry out the process on a continuous basis. When plastic films are oriented in the direction of their length, that is, longitudinally, there are a number of methods for producing suitable orientation, so that split fiber webs may be produced from the films. One of these methods is to stretch the film over a long enough length so that there is little, or no restriction at the mid-point of the film and as the film passes through the mid-point between the stretching operations it will be given a high degree of orientation. Another technique for accomplishing this is disclosed in U.S. Patent No. 3,233,029 to Ole-Bendt Rasmussen, wherein, longitudinal folds are placed in the film in the stretching zone to reduce the restriction in the transverse direction of the film.

Though the known methods are suitable for producing a longitudinal orientation in a plastic film, none of them are adaptable to produce that same type of orientation in the transverse direction of the plastic film. The reason for this, it is believed, is that because a continuous method is desired, the film must always be moved in the longitudinal direction as it is being processed, and by so doing there is virtually always some force perpendicular to the direction of the desired orientation which prevents or greatly reduces the orientation of the film in the transverse direction.

We have discovered a method for orienting plastic films in their transverse direction in a continuous operation so that the film may be given a sufficient orientation to allow fibrillation and produce split fiber webs having a predominant orientation of fibers in the transverse direction. Furthermore, our method allows for orientation in the transverse direction either of cold films, or warm films and the orientation is substantially uniform over the entire width of the plastic film.

We have discovered that if the film is decelerated within a specific range in the longitudinal direction of the film, the film may be stretched in the transverse direction sufficient to produce a high degree of orientation in the transverse direction, whereby, the oriented film is suitable for forming split fiber webs. The amount of deceleration will depend upon the type of film being processed and more specifically upon the desired stretch ratio utilized in the transverse direction. The film should be decelerated to about 50 to 20% of its original speed and preferably to about 40 to 25% of its original speed. At the same time the ratio of final speed of the film in the longitudinal direction to original speed of the film in the longitudinal direction should be inversely proportioned to from about ½ to⅕ of the stretch ratio being applied to the film in the transverse direction and preferably one-third to one-quarter of the stretch ratio, i.e., if the film is being stretched in a transverse direction at a ratio of 9:1, the film should be decelerated to approximately ⅓ of its original speed. In other words, the stretch ratio applied should be from about 2 to 5 times the original speed of the film divided by the decelerated speed.

There are a number of ways in which this deceleration may be accomplished, such as by over-feeding the film into the stretching zone, e.g., by placing pleats in the film in the transverse direction sufficient to give the desired deceleration rate but insufficient so that pleats are left in the oriented film, but are pulled out by the transverse orientation. Another technique for decelerating the film is to move its longitudinal edges in diverging paths to transversely orient the film at a sufficiently wide enough angle so that the horizontal component of the direction of movement of the film is much greater than the longitudinal component as will be more fully described hereinafter. Still another technique for accomplishing this deceleration is to crepe or compact the film longitudinally prior to its being placed in the transverse stretching zone. There are many techniques for compacting or creping films which are suitable for producing this deceleration in the film.

The other advantages and benefits of the present invention will become apparent from a consideration of the following description taken in conjunction with the accompanying drawings, wherein:

FIGURE 1 is a schematic side view of one form of apparatus for carrying out the method of the present invention.

FIGURE 2 is a schematic top view of the apparatus of FIGURE 1.

Figure 5:
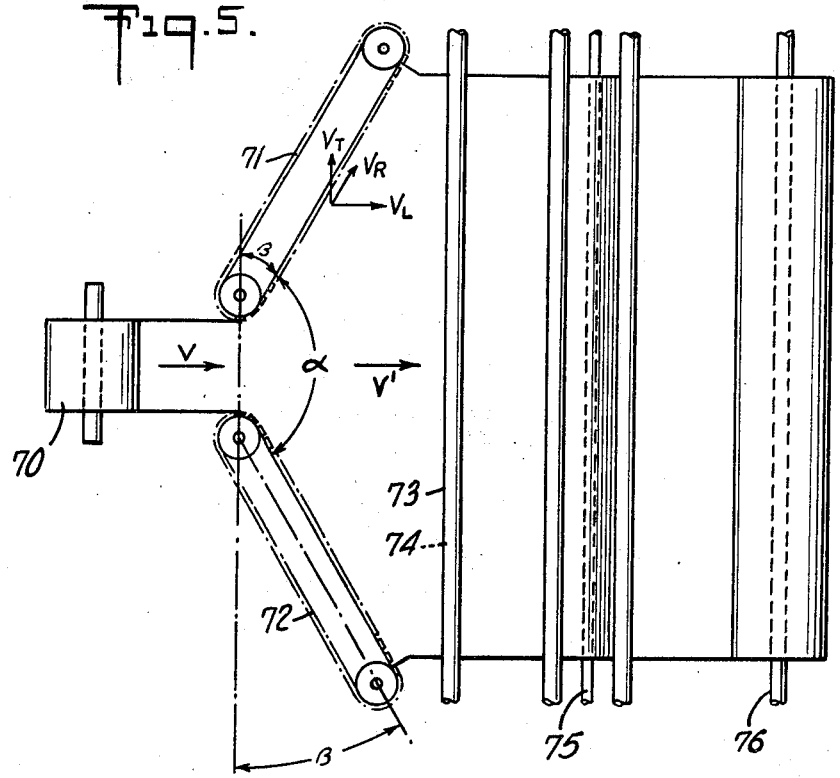
FIGURE 5 is a schematic plan view of suitable apparatus for carrying out the method of the present invention.

Referring to the drawings in FIGURES 1 and 2, there is shown a roll of film 20 suitable for use as a starting material in producing products in accordance with the present invention. The film is unoriented and is fed bewteen the nip of a pair of pleating rolls 21 and 22. The pleating rolls form the film into a sine wave configuration which is passed through the nip of a pair of pressing rolls 23 and 24 to lay the film down into closely spaced pleats lying on top of adjacent pleats. The film in this compressed pleated state is fed to the narrow end of a pair of diverging conveyors 25 and 26. The conveyors have gripping means 27 which grip the edges of the pleated film. As the conveyors diverge the film is stretched in the transverse direction and the pleats removed. During the stretching operation, the forward speed of the film is considerably less than the speed of the film being fed into the pleating means. At the wide end of the diverging conveyors the gripping means release the film and the film is carried forwardly through the nip of a pair of thick rubber belts 30 and 31. The nip of these belts is under very high compression which places longitudinal forces for short periods of time upon the film and splits the highly oriented film into a web of fibers. The film then passes through the nip of a pair of guide rolls 32 and 33 and is wound up by standard winding mechanisms 34.

Figure 3:
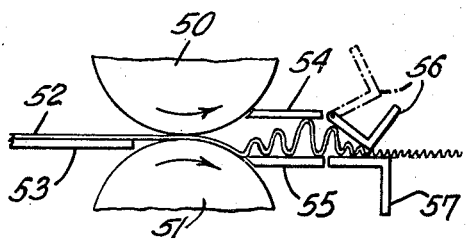
FIGURE 3 is a diagrammatic view of another type of apparatus for decelerating the film.
Figure 4:
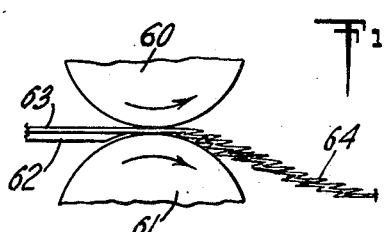
FIGURE 4 is still another diagramatic view of still another type of apparatus for decelerating the film.

In FIGURES 3 and 4 there are shown other mechanisms for decelerating the film either immediately prior to or as it is being stretched in the transverse direction. Referring to FIGURE 4 there is shown to closely spaced rotatable rolls 50 and 51 rotating in the directions indicated by their respective arrows. These rolls are preferably made of a relatively rigid material such as aluminum, steel, or natural and synthetic rubbers, and may be of the same material or different materials as desired. The rolls are preferaby rotated at approximately the same peripheral linear speeds. The unoriented film 52, is delivered along a table or feed plate 53 into the nip of the opposed spaced rolls and is discharged with a considerable pressure on the far side of the nip against one of the pair of knife or buckling elements 54 and 55. The position of these knives is adjustable and their tapered points may be so adjusted as to lie in action pressing contact with the rotating periphery of the rolls and to butt against the film being delivered from between the nip of the rolls. The angle of the knife blades is adjustable wtih respect to the periphery of the rolls and may be controlled as desired. The knife-butting action causes the film to be compacted or creped. The film is led between the pair of spaced angle brackets 56 and 57. As shown in FIGURE 3 the lower angle bracket 57 is relatively fixed with respect to the apparatus generally. The upper bracket 56, however, is pivotally mounted and is capable of pivotal movement to its lower position (shown in full) or to an upper open position (shown in outline) due to the force of the film as it piles up and is stuffed against its inner surface. The angle bracket will remain in its lower closed position until sufficient force is exerted by the accumulated film to force it open and permit the escape of some film. A weight or an equivalent pressure device may be used to control and adjust the forces required to force the angle bracket open to permit the escape of the film. Examination of the film indicates that it is creped and compacted and, of course, its relative forward motion slowed.

Another form of apparatus suitable for carrying out the deceleration in accordance with the present invention is diagrammatically set forth in FIGURE 4. Such apparatus is basically similar in construction and in operating principle to the apparatus disclosed in U.S. Patent 2,765,514 issued Oct. 9, 1956 to R. R. Walton. As shown in FIGURE 4 the essential elements of the apparatus comprises a driving roll 60, a retarding or retardation roll 61, and a film feed plate 62 having a tapered nose piece. The unoriented film 63 to be processed is fed along the feed plate, past the nose piece into the nip of the opposed space driving and retardation rolls, and processed thereby into a crimped, pleated and crinkled film 64.

The driving and retardation rolls are adjustably positioned with respect to each other, whereby, the nip between these rolls may be controlled and adjusted according to the film being processed. Similarly the positioning of the feed plate may be adjustably controlled, whereby, its inclination in the positioning of its nose piece can be regulated with respect to the nip of the rolls. The driving roll travels at a peripheral linear speed greater than the peripheral linear speed of the retardation roll. Under normal operating conditions the driving roll will have a linear speed of from about 1.2 to about 3 times or more the peripheral linear speed of the retardation roll.

After the fabric is retarded or decelerated it is then immediately stretched in the transverse direction. This may be accomplished by any of the known transverse stretching mechanisms such as a clip tenter frame. Such tenter frame comprise two endless conveyors, the inner flights of which are spaced in the same horizontal plane and positioned so that they follow diverging courses. The film is gripped at its longitudinal edges at the narrow end of the diverging course and as the conveyors diverge, the film is stretched. It is believed that the compaction or deceleration of the film in the transverse stretching zone allows the molecules within the film a degree of mobility which allows them to be relatively easily oriented in the transverse direction of the film. Without this compaction the forward speed of the film places sufficient force on the individual molecules in the longitudinal direction of the film to retard the transverse orientation so that the final oriented film is not sufficiently oriented to be split into fibrous form.

Figure 6:
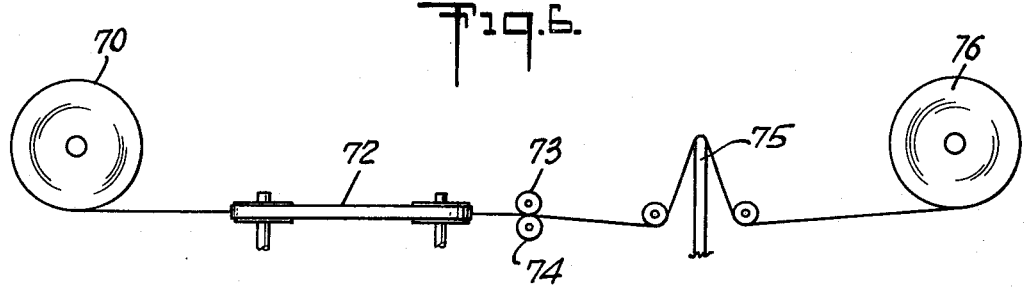
FIGURE 6 is a schemtic side view of the apparatus of FIGURE 5.

In all of the methods described so far the film is decelerated and the decelerated film stretched, however, as shown in FIGURES 5 and 6, it is possible to allow the deceleration to take place as the film is being stretched and apparatus and method for carrying out this technique is shown in FIGURES 5 and 6.

A roll of unoriented film 70 is fed to a pair of diverging conveyors 71 and 72. The film is fed into the narrow end 73. The conveyors move in their respective paths $V_R$ at the same speed as that the film V is picked up by the conveyor. The conveyors diverge at a large angle and though their angular speed $V_R$ is the same as the speed which the film is being picked up V, the forward speed of the film $V^1$ is greatly reduced. The forward speed is dependent upon the angle at which the conveyors are set which decelerates the film during the stretching and allows for mobility of molecules to provide excellent orientation in the transverse direction. It is preferred that the angle $\alpha$ between conveyors be greater than 90 degrees and preferably about 120 degrees. If the angle is too great, the film will slip out of the grips as they make the bend to start the diverging paths. The forward speed of the film $V^1$ as it is being transversely stretched is equal to the speed of the film V fed to the narrow end of the diverging conveyors times the sine of the angle B between the path of the conveyor and the line perpendicular to the direction of feed or the cosine of the angle ($\frac{1}{2}\alpha$) between the path of the conveyor and the direction of feed. If the angle B between the conveyor and the line perpendicular to the direction of feed is 30 degrees, the film will be decelerated 50% of its original speed. It is preferred that the angle B be from about 14 to 23 degrees. After the film is stretched it is carried away by a pair of nip rolls 73 and 74 rotating at the reduced speed and the film is passed over a relatively sharp knife blade 75 directed along the width of the film to place longitudinal forces over incremental areas of the film and split the highly oriented film into a split fiber network. The split fiber network is then wound up by standard wind-up mechanisms 76.

In many instances, depending upon the polymer used, it may be desirable to heat the film subsequent to the pleating operation and/or prior to the stretching in the transverse direction. Temperatures of from about 250° F. to 325° F. have been found satisfactory in heating polypropylene films and reducing the forces required to stretch the film in the transverse direction.

The invention will be further illustrated in greater detail by the following specific examples. It should be understood, however, that although these examples may describe in particular detail some of the more specific features of the invention they are given primarily for purposes of illustration and the invention in its broader aspects are not to be construed as limited thereto.

EXAMPLE 1

An unoriented linear polyethylene film 9 inches wide and 2 mils thick is pleated with the pleats running in the transverse direction of the film. Four ¼ inch by ¼ inch side pleats are put in per inch so that in one inch there are three inches of material. The film passes to a tenter frame, wherein the conveyors are diverging, the narrow end width of the conveyors is 6 inches. The forward speed of the film in the tenter frame is 15 feet per minute and the conveyors diverge at an angle of approximately 10 degrees. The film is stretched in the transverse direction at a ratio of 6:1 to orient the film in a transverse direction. The highly oriented film is passed between a pair of compression rubber belts to apply the longitudinal forces to the film and split the film into a network of fibers. The film readily splits into a fibrous network.

EXAMPLE 2

A polypropylene film 6 inches wide and 6 mils thick is fed at a speed of 200 feet per minute to a pair of diverging conveyors. It is fed to the narrow end and the edges of the film gripped by the conveyors moving in their angular paths at 200 feet per minute. The angle between conveyors is 151 degrees. The forward speed of the film as it is being stretched in the transverse direction is 50 feet per minute and the film is stretched at a ratio of 12:1. The highly transverse oriented film is passed through a pair of compression rubber belts that apply incremental forces to the film and form a network of split fibers.

Although several specific examples of the inventive concept has been described the same should not be construed as limited thereby nor to the specific substances or constructions mentioned therein, but to include various other equivalent substances and constructions as set forth in the claims appended hereto. It is understood that any suitable changes, modifications and variations may be made without departing from the spirit and scope of the invention.

What is claimed is:

1. A continuous process for producing a transversely oriented fibrillatable film from an orientable polyolefin film selected from the class consisting of polyethylene film and polypropylene film comprising continuously moving the film in its longitudinal direction at an original speed, decelerating the film to a final speed of from about 50% to 20% of the original speed and stretching the film in the transverse direction at a stretch ratio equal to from about 2 to 5 times the original speed divided by the final speed whereby the molecules in the film are mobile and readily orient in the transverse direction while leaving the film unoriented in the longitudinal direction.

2. A method according to claim 1, wherein, the final speed of the film is from about 40% to 25% of the original speed.

3. A method according to claim 1, wherein, the stretch ratio is equal to from about 3 to 4 times the original speed divided by the final speed.

4. A method according to claim 1, wherein, the deceleration and transverse stretching of the film are carried out simultaneously.

5. A method according to claim 1, wherein, the film is a polypropylene film.

6. A method according to claim 1, wherein, the film is decelerated by pleating the film with the pleats running in the transverse direction of the film.

7. A method according to claim 1, wherein, the deceleration and transverse stretching of the film are carried out simultaneously by diverging the longitudinal edges of the film at an angle of at least 120 degrees to each other.

8. A method according to claim 1, wherein, the deceleration and transverse stretching of the film are carred out simultaneously by diverging the longitudinal edges of the film at an angle of from about 134 degrees to 152 degrees to each other.

9. A method according to claim 1, wherein, the stretch ratio is from about 4:1 to 15:1.

References Cited

UNITED STATES PATENTS

| | | | |
|---|---|---|---|
| 2,335,313 | 11/1943 | Rowe et al. | 264—282 |
| 2,434,111 | 1/1948 | Hawley et al. | 26—57 |
| 2,673,384 | 3/1954 | Roberts. | |
| 2,720,018 | 10/1955 | Blount. | |
| 3,165,563 | 1/1965 | Rasmussen | 264—286 |
| 3,233,029 | 2/1966 | Rasmussen | 264—288 |
| 3,296,351 | 1/1967 | Rasmussen | 264—289 |
| 2,494,334 | 1/1950 | Dorst | 264—288 |

JULIUS FROME, Primary Examiner

H. MINTZ, Assistant Examiner

U.S. Cl. X.R.

26—57; 28—72; 264—282, 342